US006658925B2

(12) United States Patent
Cook et al.

(10) Patent No.: US 6,658,925 B2
(45) Date of Patent: Dec. 9, 2003

(54) INITIALIZATION METHOD OF AN AUTOMOTIVE EVAPORATIVE EMISSION LEAK DETECTION SYSTEM

(75) Inventors: John Cook, Chatham (CA); Craig A. Weldon, Chatham (CA); Paul D. Perry, Chatham (CA); Raymond Rasokas, Thamesville (CA)

(73) Assignee: Siemens Canada Limited (CA)

(*) Notice: Subject to any disclaimer, the term of this patent is extended or adjusted under 35 U.S.C. 154(b) by 0 days.

(21) Appl. No.: 10/315,943

(22) Filed: Dec. 11, 2002

(65) Prior Publication Data

US 2003/0079533 A1 May 1, 2003

Related U.S. Application Data

(62) Division of application No. 09/867,760, filed on May 31, 2001, which is a division of application No. 09/037,784, filed on Mar. 10, 1998, now Pat. No. 6,260,410.

(60) Provisional application No. 60/058,275, filed on Sep. 9, 1997, and provisional application No. 60/057,962, filed on Sep. 5, 1997.

(51) Int. Cl.[7] .................... G01M 15/00

(52) U.S. Cl. .................... 73/118.1; 123/516; 73/49.7

(58) Field of Search .................... 123/434, 510, 123/516; 73/116, 117.2, 117.3, 118.1, 39, 40, 46, 47, 49.7

(56) References Cited

U.S. PATENT DOCUMENTS

| | | | | |
|---|---|---|---|---|
| 5,146,902 | A | 9/1992 | Cook et al. | 123/518 |
| 5,267,470 | A | 12/1993 | Cook | 73/49.7 |
| 5,383,437 | A | 1/1995 | Cook et al. | 123/520 |
| 5,474,050 | A | 12/1995 | Cook et al. | 123/520 |
| 5,606,121 | A | 2/1997 | Blomquist et al. | 73/118.1 |
| 5,614,665 | A | 3/1997 | Curran et al. | 73/118.1 |
| 5,739,421 | A | 4/1998 | Iochi et al. | 73/49.7 |
| 5,750,888 | A | 5/1998 | Matsumoto et al. | 73/118.1 |
| 5,763,764 | A | 6/1998 | Mieczkowski et al. | 73/40 |
| 5,767,395 | A | 6/1998 | Goto et al. | 73/118.1 |
| 5,898,103 | A | 4/1999 | Denz et al. | 73/49.2 |
| 5,898,108 | A | 4/1999 | Mieczkowski et al. | 73/118.1 |
| 5,964,812 | A | 10/1999 | Schumacher et al. | 701/31 |
| 6,260,410 | B1 | 7/2001 | Cook et al. | 73/118 |

*Primary Examiner*—Eric S. McCall

(57) ABSTRACT

An on-board evaporative emission leak detection system and method that detects leakage from an evaporative emission space of a fuel system of an automotive vehicle. A test includes an initialization, or stabilization, phase during which a differential between pressure in the evaporative emission space and atmospheric pressure is created, and then varied, over time, within a range of differential pressures suitable for performing a leak detection test. This varying of pressure differential alternately increases the created pressure differential above a nominal pressure differential and decreases the created pressure differential below the nominal pressure differential. The leak detection test is then performed.

10 Claims, 3 Drawing Sheets

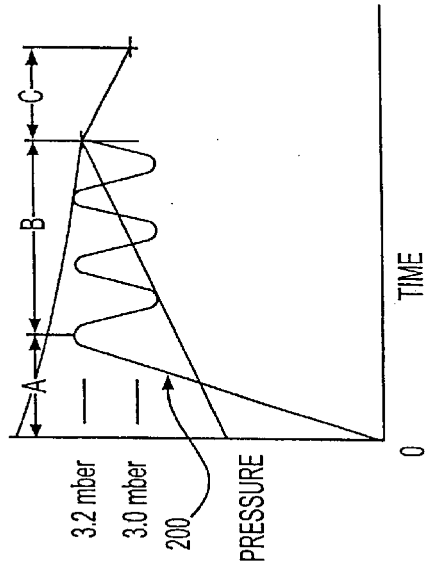
FIG. 3
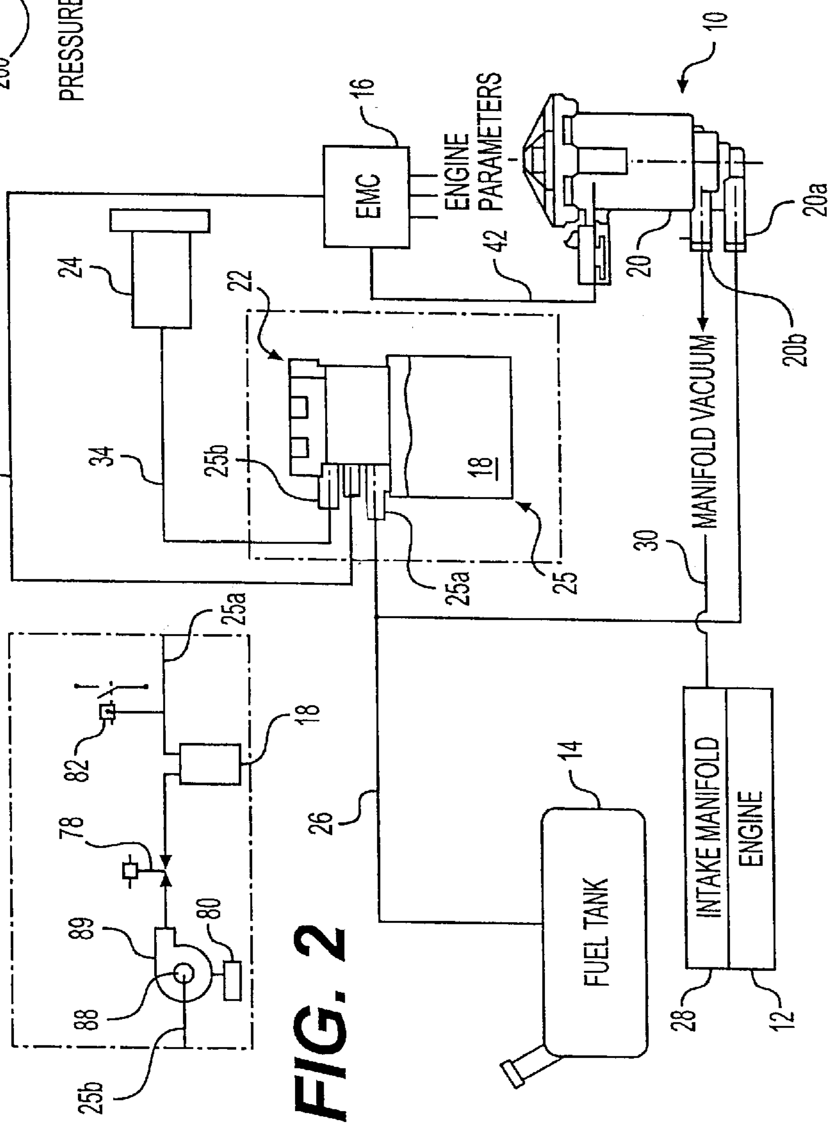
FIG. 1
FIG. 2

INITIALIZATION METHOD OF AN AUTOMOTIVE EVAPORATIVE EMISSION LEAK DETECTION SYSTEM

REFERENCE TO RELATED APPLICATION AND PRIORITY CLAIM

This is a divisional application of copending application Ser. No. 09/867,760, filed on May 31, 2001, which is a divisional application of application Ser. No. 09/037,784, filed on Mar. 10, 1998 (now U.S. Pat. No. 6,260,410)."

FIELD OF THE INVENTION

This invention relates generally, to an on-board system and method for detecting fuel vapor leakage from an evaporative emission space of an automotive vehicle fuel system.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

It is believed fair to say that there are two basic types of diagnostic systems and methods for determining integrity of an evaporative emission space against leakage.

Commonly owned U.S. Pat. No. 5,146,902 "Positive Pressure Canister Purge System Integrity Confirmation" discloses one type: namely, a system and method for making a leakage determination by pressurizing the evaporative emission space to a certain positive pressure therein (the word "positive" meaning relative to ambient atmospheric pressure) and then watching for a drop in positive pressure indicative of a leak.

Commonly owned U.S. Pat. No. 5,383,437 discloses the use of a reciprocating pump to create test pressure in the evaporative emission space.

A reed switch is disposed to sense reciprocation of the pump mechanism, and serves both to cause the pump mechanism to reciprocate at the end of a compression stroke and as an indication of how fast air is being pumped into the evaporative emission space. The frequency of switch operation provides a measurement of leakage that can be used to distinguish between integrity and non-integrity of the evaporative emission space.

Commonly owned U.S. Pat. No. 5,474,050 embodies advantages of the pump of U.S. Pat. No. 5,383,437 while providing certain improvements in the organization and arrangement of that general type of pump. More specifically, the pump of U.S. Pat. No. 5,474,050: enables integrity confirmation to be made while the engine is running; enables integrity confirmation to be made over a wide range of fuel tank fills between full and empty so that the procedure is for the most part independent of tank size and fill level; provides a procedure that is largely independent of the particular type of volatile fuel being used; provides the pump with novel internal valving for selectively communicating the air pumping chamber space, a first port leading to the evaporative emission space, and a second port leading to atmosphere; and provides a reliable, cost-effective means for compliance with on-board diagnostic requirements for assuring leakage integrity of an evaporative emission control system.

The other of the two general types of systems for making a leakage determination does so by creating in the evaporative emission space a certain negative pressure (the word "negative" meaning relative to ambient atmospheric pressure so as to denote vacuum) and then watching for a loss of vacuum indicative of a leak. A known procedure employed by this latter type of system in connection with a diagnostic test comprises utilizing engine manifold vacuum to create vacuum in the evaporative emission space. Because that space may, at certain non-test times, be vented through the canister to allow vapors to be efficiently purged when the CPS valve is opened for purging fuel vapors from the tank headspace and canister, it is known to communicate the canister vent port to atmosphere through a vent valve that is open when vapors are being purged to the engine, but that closes preparatory to a diagnostic test so that a desired test vacuum can be drawn in the evaporative emission space for the test. Once a desired vacuum has been drawn, the purge valve is closed, and leakage appears as a loss of vacuum during the length of the test time after the purge valve has been operated closed.

In order for an engine management computer to ascertain when a desired vacuum has been drawn so that it can command the purge valve to close, and for loss of vacuum to thereafter be detected, it is known to employ an electric sensor, or transducer, that measures negative pressure, i.e. vacuum, in the evaporative emission space by supplying a measurement signal to the engine management computer. It is known to mount such a sensor on the vehicle's fuel tank where it will be exposed to the tank headspace. For example, commonly owned U.S. Pat. No. 5,267,470 discloses a pressure sensor mounting in conjunction with a fuel tank rollover valve.

SUMMARY OF THE INVENTION

One generic aspect of the present invention relates to a method of initializing an evaporative emission space of a fuel storage system of an automotive vehicle preparatory to performing a leak detection test on the evaporative emission space, the vehicle being powered by a fuel-consuming engine and including an evaporative emission control system for purging fuel vapor from the evaporative emission space to the engine for combustion therein during conditions conducive to purging, the method comprising: creating a differential between pressure in the evaporative emission space and atmospheric pressure sufficient to perform a leak detection test; varying, over time, the created pressure differential within a range of differential pressures sufficient to perform a leak detection test; and then isolating the evaporative emission space from communication with both the engine and atmosphere, and performing a leak detection test.

Another generic aspect of the present invention relates to an engine-powered automotive vehicle evaporative emission control having a fuel storage system comprising an evaporative emission space for containing volatile fuel vapors generated by the volatilization of fuel in the storage system and a purge valve for purging fuel vapors from the evaporative emission space to an engine for combustion therein during conditions conducive to purging, including a leak detection system for detecting leakage from the evaporative emission space which comprises: a selectively operable prime mover for pumping gaseous fluid with respect to the evaporative emission space; a selectively operable valve which operates to a first condition for allowing the prime mover to move gaseous fluid with respect to the evaporative emission space, and to a second condition disallowing the prime mover from moving gaseous fluid with respect to the evaporative emission space; and a sensor providing an electric signal related to pressure in the evaporative emission space for controlling operation of the prime mover and of the valve; the leak detection system initializing the evaporative emission space preparatory to performing a leak detection test by causing the pump to create a differential between pressure in the evaporative emission space and atmospheric pressure sufficient to perform a leak detection test, including varying, over time, the created pressure differential within a range of differential pressures sufficient to perform a leak detection test, and then isolating the evaporative emission space from communication with both the engine and atmosphere and performing a leak detection test.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

BRIEF DESCRIPTION OF THE DRAWINGS

FIG. 1 is a general schematic diagram of an automotive vehicle evaporative emission control system including a leak detection system embodying principles of the invention.

FIG. 2 is a more detailed schematic diagram of a portion of the system.

FIG. 3 is a representative graph plot useful in explaining certain principles of the invention.

Description of the Preferred Embodiment

Figure 4:
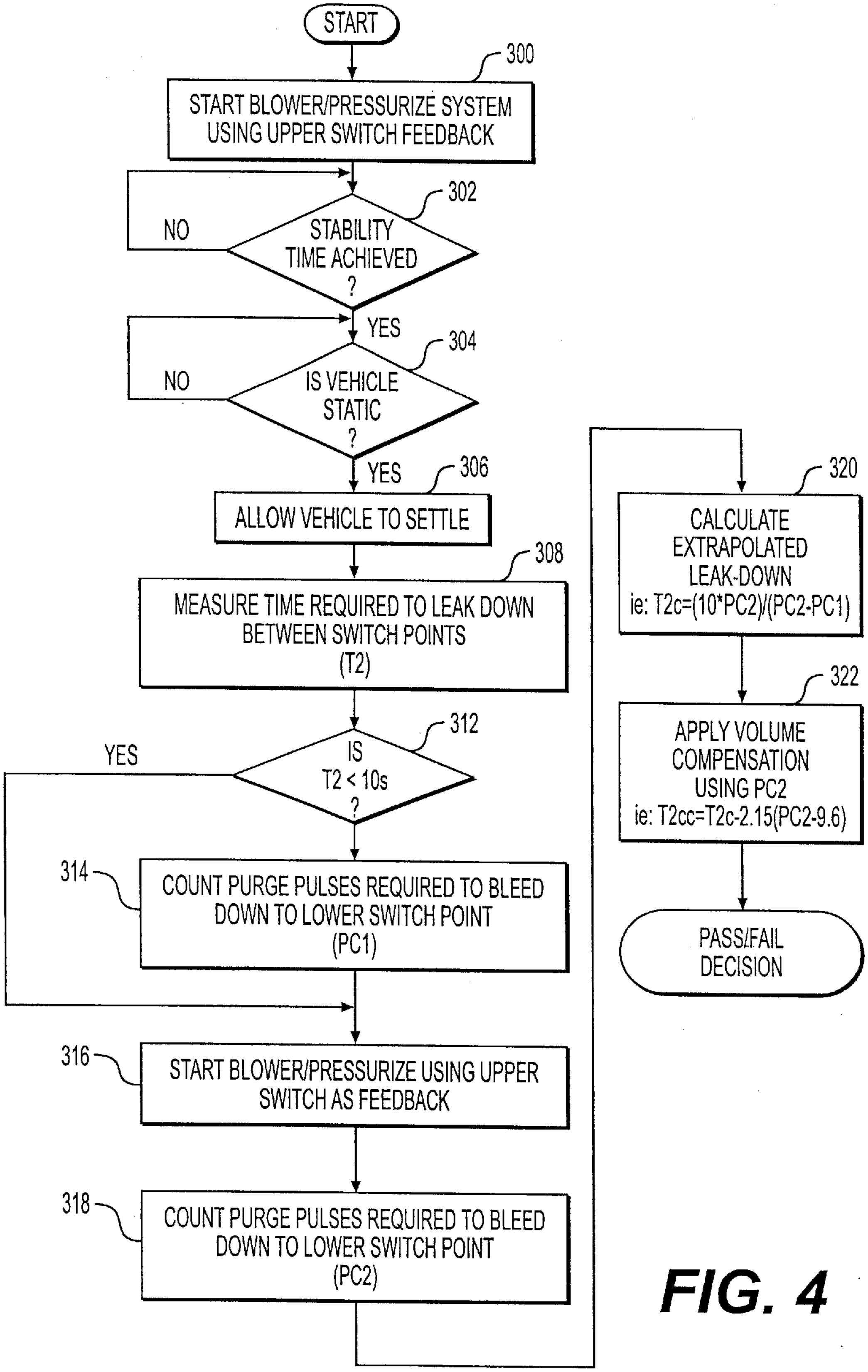
FIG. 4 is a flow diagram illustrating steps according to principles of the invention.

FIG. 1 shows an automotive vehicle evaporative emission control (EEC) system 10 in association with an internal combustion engine 12 that powers the vehicle, a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, a proportional purge solenoid (PPS) valve 20, a leak detection module (LDM) 22, and a particulate filter 24. In the illustrated embodiment, LDM 22 and canister 18 are shown as an integrated assembly, or module, 25.

Headspace of fuel tank 14, a port 25*a* of module 25, and an inlet port 20*a* of PPS valve 20 are placed in common fluid communication by a conduit 26 so that the tank headspace and the canister cooperatively define evaporative emission space within which fuel vapors generated by volatilization of fuel in tank 14 are temporarily confined and collected until purged to an intake manifold 28 of engine 12. Another conduit 30 fluid-connects an outlet port 20*b* of PPS valve 20 with intake manifold 28. Another conduit 34 fluid-connects a port 25*b* of module 25 to atmosphere via filter 24.

EMC 16 receives a number of inputs (engine-related parameters for example) relevant to control of certain operations of engine 12 and its associated systems, including EEC system 10. One electrical output port of EMC 16 controls PPS valve 20 via an electrical connection 42; other ports of EMC 16 are coupled with module 25 via electrical connections, depicted generally by the reference numeral 44 in FIG. 1.

From time to time, EMC 16 commands LDM 22 to an active state as part of an occasional leak detection test procedure for ascertaining the integrity of EEC system 10, particularly the evaporative emission space that contains volatile fuel vapors, against leakage. During occurrences of such a diagnostic procedure, EMC 16 commands PPS valve 20 to close. At times of engine running other than during such leak detection procedures, LDM 22 reposes in an inactive state, and in doing so provides an open vent path from the evaporative emission space, through module 25 and filter 24, to atmosphere. A vapor adsorptive medium within canister 18 prevents escape of fuel vapor to atmosphere during such venting.

EMC 16 selectively operates PPS valve 20 such that the valve opens under conditions conducive to purging and closes under conditions not conducive to purging. Thus, during times of operation of the automotive vehicle, the canister purge function is performed in a known manner for the particular vehicle and engine so long as the leak detection test procedure is not being performed. When the leak detection test procedure is being performed, the canister purge function is not performed. During a leak detection test, the evaporative emission space is isolated from both atmosphere and the engine intake manifold so that it can be initially pressurized by LDM 22, and the pressure thereafter allowed to decay if leakage is present.

LDM 22 comprises a solenoid-operated valve 78; an electric motor 80, a D.C. motor in the disclosed embodiment for use with an automotive vehicle D.C. electric system; and an electric sensor 82 for supplying an electric signal related to a fuel vapor parameter, the, disclosed embodiment being a pressure switch that supplies a signal related to vapor pressure to EMC 16.

A pumping mechanism that comprises an impeller is operated by motor 80. This construction forms a variable displacement pump for pumping gaseous fluid, i.e. a blower, that is designated by reference numeral 89 in FIG. 2.

A pressure switch that has a certain pre-defined hysteresis in its switching characteristic is particularly well-suited for use as sensor 82. Such a sensor comprises a first pressure sensing zone communicated to port 25_b_, and a second pressure sensing zone communicated to the same portion of canister 18 to which port 25_a_ is communicated. Sensor 82 assumes a first switch state (open for example) so long as the pressure difference between its two sensing zones is less than a certain magnitude. When that magnitude is exceeded, the sensor operates to a second switch state (closed for example). The sensor possesses a certain hysteresis in its switching characteristic whereby it will switch back to its first state only when the magnitude of the pressure difference between its two sensing zones returns to a certain magnitude that is smaller by a predetermined amount than the magnitude at which it switched from its first state to its second state.

The "dirty air" side of the vapor adsorbent medium within canister 18 is in continuous communication with port 25_a_. Hence, when valve 78 is not being energized, the earlier-mentioned vent path to atmosphere through module 25 is open because there is no significant flow restriction between ports 25_a_ and 25_b_. FIG. 2 schematically depicts the organization and arrangement of blower 89, valve 78, canister 18, and sensor 82 in the flow path. It can be seen that blower 89 and valve 78 are on the clean air side while sensor 82 is on the dirty air side.

When valve 78 is energized, the vent path to atmosphere is closed. Energization of its solenoid closes valve 78, blocking communication between port 25_a_ and the pump.

When no leak detection test is being performed, PPS valve 20 is operated by EMC 16 to periodically purge vapors from canister 18 and the tank headspace to engine 12. The exact scheduling of such purging is controlled by the vehicle manufacturer's requirements. During non-test times the vent path to atmosphere is open through module 25 and filter 24 so that the evaporative emission space is communicated to atmosphere, keeping the evaporative emission space generally at atmospheric pressure.

Preparatory to performing a leak detection test on EEC system 10, PPS valve 20 is operated closed by EMC 16. EMC 16 also commands operation of motor 80 to rotate impeller 88. Valve 78 remains de-energized, causing the internal flow path between ports 25_a_ and 25_b_ to be open. The operation of the pump by motor 80 begins building pressure in the evaporative emission space comprising headspace of tank 14, canister 18, and any spaces, such as associated conduits, that are in communication therewith. Naturally all closures, such as the vehicle tank filler cap, must be in place to close the evaporative emission space under test except for the air being pumped into it via module 25. By being exposed to port 25_a_, the second sensing zone of sensor 82 is exposed to a pressure representative of the pressure in the evaporative emission space under test.

If there are no conditions, such as a "pinched line" or a "gross leak" for example, that prevent a pre-defined test pressure programmed into EMC 16 from being created in the evaporative emission space within a pre-defined window of time along a time line commenced by internal counting within EMC 16 at the beginning of the initialization of the evaporative emission space preparatory to performing a leak detection test, sensor 82 will eventually switch from its first state to its second state to signal that the pre-defined initial test pressure has been reached At that time, EMC 16 throttles down motor 80, either partially or entirely.

The graph plot 200 of FIG. 3 shows a representative plot of evaporative emission space pressure referenced to atmosphere as a function of time. The initialization phase comprises the time intervals marked A and B. Time interval A shows the increasing positive pressurization of the evaporative emission space from the beginning of the initialization until sensor 82 switches to its second state at the predefined initial test pressure. The beginning of time interval B depicts a condition where motor 80 is operated so as to throttle down blower 89, causing the pressure in the evaporative emission space to begin to decrease.

When the pressure has decreased sufficiently to cause sensor 82 to revert to its first state, EMC 16 causes motor 80 to throttle up, causing the pressure in the evaporative emission space to again increase. Time interval B is characterized by several of these cycles of throttling the blower up and down, as portrayed in FIG. 3. Such cycling has been found beneficial in achieving improved stability of the pressure in the evaporative emission space at the commencement of a leak detection test. However, by programming EMC 16 with different algorithms, improved stability may be obtained is various ways to be described later.

The end of time interval B marks the end of the initialization phase. The leak detection test commences at the beginning of time interval C at which time valve 78 is operated closed and blower 89 throttled down to the extent of complete shut off. Because PPS valve 20 has been closed during time intervals A and B, the closure of valve 78 results in isolation of the evaporative emission space from both atmosphere and the engine.

Had a pressure within a range of pressures suitable for performing a leak detection test not been attained in the evaporative emission space by the end of a certain amount of time after commencement of the initialization phase at time 0.0 seconds, a "gross leak" would have been indicated and the ensuing leak detection test aborted. Had a pre-defined pressure been attained before a pre-defined minimum time after commencement of the initialization phase at time 0.0 seconds, a "pinched line" would have been indicated and the ensuing leak detection test aborted.

On the other hand, if there is neither a gross leak nor a pinched line, and if some leakage from the evaporative emission space actually exists, that leakage will cause the pressure to begin dropping, as represented by the portion of graph plot 200 during time interval C. At the beginning of time interval C, EMC 16 commences timing a pre-defined test time duration. If the evaporative emission space pressure has not decayed sufficiently to cause sensor 82 to revert to its first state by the end of this pre-defined time duration, the evaporative emission space is deemed to have successfully passed the test. Should the pressure decay to a level causing sensor 82 to revert to its first state, such reversion is detected by EMC 16 and the EMC logs the time at which this occurred. EMC 16 can then calculate the extent of leakage and indicate whether the test has been passed or failed.

In the example illustrated by graph plot 200, it is shown that time interval B comprises cycling of the pressure within a range between 3.2 millibars and 3.0 millibars. Hence 3.1 millibars may be considered a nominal pressure above and below which the created pressure repetitively alternately increases and decreases. This varying of pressure occurs over a range of positive pressures that are sufficiently high to enable a leak detection test to proceed, and has been found to promote repeatable accuracy of test results.

Because the amount of liquid fuel in the fuel tank influences the volume of the tank headspace, and hence evaporative emission space volume, a tank with less liquid fuel will take longer both to pressurize and to de-pressurize than one with more liquid fuel. Therefore, in order to obtain a proper measurement of effective leak size, compensation for the amount of liquid fuel in the tank is part of the disclosed procedure.

Variation in tank fuel vapor pressure may also affect test results. Incorporation of the inventive principles into a negative pressurizing system would tend to promote fuel volatilization when vacuum is drawn, and if volatilization were significant, correction for it might be appropriate. On the other hand, a system like the one described, that positively pressurizes the evaporative emission space for a test, tends to inhibit fuel volatilization. For practical purposes, such a positive pressure system is believed not to require fuel volatilization correction in light of the expectation that testing will be repeatedly periodically conducted over times that include times of non-volatilization of fuel when a test will give a true leak measurement, free of influence by volatilizing fuel. During times of fuel volatilization however, a test will give a measurement which, although affected by volatilizing fuel, will be smaller than the true leak size, and therefore will not cause a fault to be flagged. In the case of a negative pressure system, a fault would be flagged and might result in an unnecessary and wasteful visit to a service facility. Overall considerations therefore suggest that positive pressurization may be more robust and is to be preferred.

Altitude variations can be corrected in vehicles that have MAP sensors because such sensors have the capability of approximating altitude. Correction is made by a suitable algorithm.

FIG. 4 discloses a flow diagram representing another algorithm for conducting a leak detection test. Steps 300, 302 correspond to the stabilization procedure that is performed during time intervals A and B in FIG. 3 while PPS valve 20 is closed. The stabilization time may be 120 seconds by way of example. Once pressure stability has been achieved, step 304 executes to assure that the vehicle is static, i.e. at a complete stop with the engine confirmed at idle. Step 306 provides that the vehicle should be static for a certain amount of time before the test proceeds. Should the vehicle start to move at any time during a test, that test will be aborted and the algorithm will revert back to the stabilization, or initialization, phase.

Once the required static time has elapsed, step 308 executes. This step comprises operating valve 78 closed, followed by shutting down blower 89. Leakage will cause the pressure in the space under test to decrease. When the pressure trips the upper switch set point, a leak-down timer is started. When the pressure trips the lower switch set point, the time that has been counted by the leak-down timer represents a leak-down time measurement. That measurement is a measure of system leakage and is dependent on system volume.

Step 312 compares the leak-down time measurement obtained from step 308 with a preset time, ten seconds in this example. If the leak-down time measurement is less than that preset time, the test proceeds directly to step 316.

On the other hand, if the timer times to that preset time without the pressure having tripped the lower switch set point, then an extrapolation technique is employed to predict an extrapolated leak-down time. That technique comprises pulsing PPS valve 20 (step 314) until the pressure in the system under test trips the lower switch set point. The number of pulses needed to cause tripping of the lower switch set point constitutes a pulse count PC1, which is a measure both of remaining pressure and tank volume. After pulse count PC1 has been obtained, the algorithm proceeds to step 316.

Step 316 comprises re-pressurizing the tank to the upper switch set point for several seconds. Step 318 follows, and comprises pulsing PPS valve 20 until the pressure trips the lower switch set point. The number of pulses needed to cause such tripping constitutes a pulse count PC2 which is primarily a measure of system volume. After pulse count PC2 has been obtained, the algorithm proceeds to step 320.

Step 320 comprises a calculation step that executes the formula shown therein to calculate an extrapolated leak-down time.

Step 322 applies volume compensation either to the actual leak-down time measurement obtained from step 308 or to the extrapolated leak-down time obtained from step 320, as the case may be depending on the result of step 312. Step 322 performs the calculation indicated therein. The numbers 2.15 and 9.6 are values of respective parameters k1, k2 that are specific to the particular vehicle system. The final result of step 322 is a value that is compared to a value representing a demarcation between acceptable (pass) and unacceptable (fail) leakage.

Figure 5:
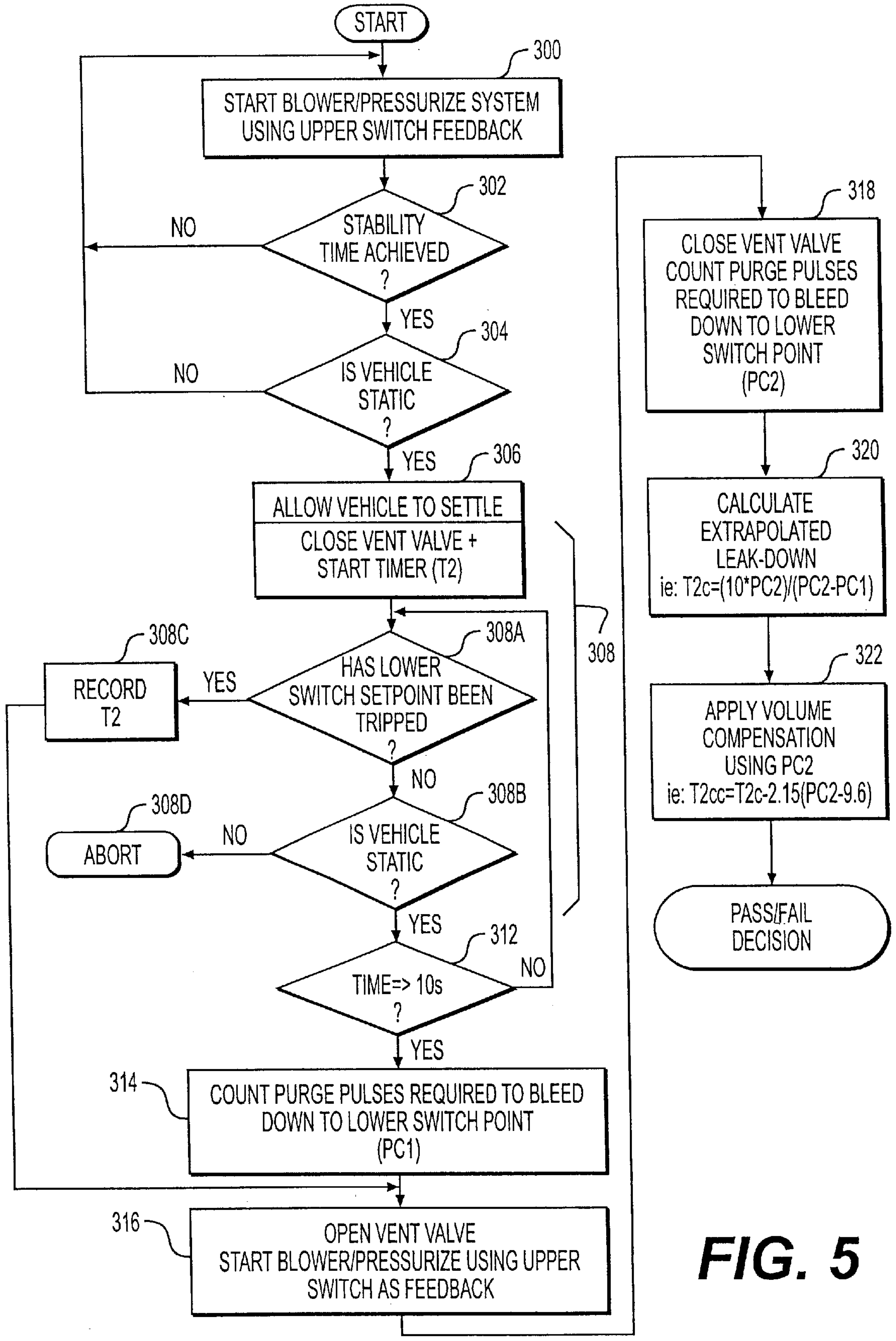
FIG. 5 is a flow diagram like that of FIG. 4, illustrating expanded detailed of a portion of that flow diagram.

FIG. 5 discloses further detail of a portion of the algorithm of FIG. 4, and like reference numerals are used to identify like steps. Steps 308 and 312 have been expanded in FIG. 4 to expressly illustrate the monitoring of certain conditions. Decision block 308A denotes monitoring the status of sensor 82 for the purpose of ascertaining whether the lower switch set point has been tripped. Decision block 308B denotes monitoring for continued vehicle stability. Decision block 312 denotes monitoring the time being counted by the leak-down timer and includes a showing of the iterative return that occurs when the time has not yet elapsed to the 10 second time limit.

When decision block 308A is encountered, sensor 82 is monitored to ascertain whether or not the lower switch set point has been tripped. If not, step 308 continues by monitoring for continued vehicle stability (decision block 308B). Continued stability causes decision block 312 to be encountered. As long as the 10 second time limit has not elapsed, step 308 reiterates. Should the lower switch set point be tripped before the 10 second time limit has been reached, the elapsed time is recorded (block 308C of FIG. 5), and the algorithm advances to step 316. If, at any time during the iterations of step 308, stability of the vehicle is not confirmed, the test is aborted (block 308D of FIG. 5), and the algorithm reverts to the initialization phase. If the 10 second time limit is reached, without the lower switch set point having been tripped, the algorithm advances to step 314.

The pulsing that occurs during step 314 comprises one or more cycles of opening and then re-closing valve 20, the open and closed time intervals being precisely defined so that the ensuing flow through the valve is similarly defined. The number of such cycles required to reduce the pressure in the evaporative emission space to a pressure that trips the lower switch set point forms pulse count PC1. An example of a sensor 82 that is suitable for the implementation of the algorithm is an MPL 9300 Series switch. Such a switch may be set to correlate the upper switch set point to 10 inches $H_2O$ pressure, by way of example, and the lower switch set point to 9.5 inches $H_2O$ pressure, by way of example.

The algorithm of FIGS. 4 and 5 is advantageous because it uses extrapolation and volume compensation techniques. It can reduce the overall amount of time required for performance of a leak detection test irrespective of effective leak area, evaporative emission space volume, and relative proportions of liquid and vapor in the fuel tank.

While a presently preferred embodiment of the invention has been illustrated and described, it should be appreciated that principles are applicable to other embodiments that fall within the scope of the following claims.

What is claimed is:

1. An engine-powered automotive vehicle evaporative emission control having a fuel storage system comprising an evaporative emission space for containing volatile fuel vapors generated by the volatilization of fuel in the storage system and a purge valve for purging fuel vapors from the evaporative emission space to an engine for combustion therein during conditions conducive to purging, including a leak detection system for detecting leakage from the evaporative emission space which comprises:

a selectively operable prime mover for pumping gaseous fluid with respect to the evaporative emission space;

a selectively operable valve which operates to a first condition for allowing the prime mover to move gaseous fluid with respect to the evaporative emission space, and to a second condition disallowing the prime mover from moving gaseous fluid with respect to the evaporative emission space; and a sensor providing an electric signal related to pressure in the evaporative emission space for controlling operation of the prime mover and of the valve;

the leak detection system initializing the evaporative emission space preparatory to performing a leak detection test by causing the pump to create a differential between pressure in the evaporative emission space and atmospheric pressure sufficient to perform a leak detection test, including varying, over time, the created pressure differential within a range of differential pressures sufficient to perform a leak detection test, and then isolating the evaporative emission space from communication with both the engine and atmosphere and performing a leak detection test.

2. An evaporative emission control as set forth in claim 1 in which the leak detection system initializes the evaporative emission space by increasing and decreasing the created pressure differential relative to a nominal pressure differential.

3. An evaporative emission control as set forth in claim 2 in which the leak detection system initializes the evaporative emission space by alternately increasing the created pressure differential above the nominal pressure differential and decreasing the created pressure differential below the nominal pressure differential.

4. An evaporative emission control as set forth in claim 3 in which the leak detection system initializes the evaporative emission space by a plurality of such alternate increases and decreases.

5. An evaporative emission control as set forth in claim 1 in which the leak detection system initializes the evaporative emission space by varying the pressure differential over a range between approximately 0.1 millibar above the nominal pressure differential and approximately 0.1 millibar below the nominal pressure differential.

6. An evaporative emission control as set forth in claim 5 in which the leak detection system initializes the evaporative emission space by establishing the nominal pressure differential at approximately 3.1 millibars.

7. An evaporative emission control as set forth in claim 1 in which the leak detection system initializes the evaporative emission space by varying the pump operation while the valve is open.

8. An evaporative emission control as set forth in claim 7 in which the leak detection system initializes the evaporative emission space by alternately throttling the pump up and down while the valve is open.

9. An evaporative emission control as set forth in claim 8, in which the leak detection system concludes the initialization of the evaporative emission space by closing the valve and stopping the pump.

10. An evaporative emission control as set forth in claim 1 in which the leak detection system initializes the evaporative emission space by creating a positive pressure in the evaporative emission space relative to atmospheric pressure.

* * * * *